United States Patent [19]
Saito et al.

[11] Patent Number: 5,148,367
[45] Date of Patent: Sep. 15, 1992

[54] EUROPEAN LANGUAGE PROCESSING MACHINE WITH A SPELLING CORRECTION FUNCTION

[75] Inventors: Keizo Saito, Soraku; Kazuhiko Matsuo; Hiroko Murai, both of Yamatokoriyama, all of Japan

[73] Assignee: Sharp Kabushiki Kaisha, Osaka, Japan

[21] Appl. No.: 627,927

[22] Filed: Dec. 17, 1990

Related U.S. Application Data

[63] Continuation of Ser. No. 313,493, Feb. 22, 1989, abandoned.

[30] Foreign Application Priority Data

Feb. 23, 1988 [JP] Japan .................................. 63-40162

[51] Int. Cl.$^5$ .............................................. G06F 5/00
[52] U.S. Cl. .................................... 364/419; 434/167
[58] Field of Search ................ 364/419, 900; 434/167; 371/30

[56] References Cited

U.S. PATENT DOCUMENTS

| 3,188,609 | 6/1965 | Harmon et al. ................... 571/30 |
| 3,969,698 | 7/1976 | Bollinger et al. ............... 340/146.3 |
| 4,383,307 | 5/1983 | Gibson ............................... 364/900 |
| 4,456,969 | 6/1984 | Herzik et al. ..................... 364/900 |
| 4,580,241 | 4/1986 | Kuegra ............................... 434/167 |
| 4,771,401 | 9/1988 | Kaufman et al. ................. 364/900 |
| 4,797,855 | 1/1989 | Duncan, IV et al. ............. 400/61 |
| 4,829,472 | 5/1989 | McCourt et al. .................. 364/419 |
| 4,833,610 | 5/1989 | Zamora et al. .................... 434/167 |
| 4,859,091 | 8/1989 | Ueda .................................. 364/419 |

OTHER PUBLICATIONS

Kimberell, Roy E., "Searching for Text? Send An N-Gram!", Byte, vol. 13 No. 5, May 1988, p. 297.
(Anonymous), "Read-17", MacUser, vol. 4, No. 2, Feb. 1988, pp. 90-91.
Suen, "N-Gram Statistics for Natural Language Understanding and Text Processing", IEEE Transactions on Pattern Analysis and Machine Intelligence, vol. PAN-N-1, No. 2 Apr. 1979.
Cornew, "A Statistical Method of Spelling Correction", Information and Control, vol. 12, pp. 79-93, 1968.
Hall et al., "Approximate Strong Matching", Computing Surveys, vol. 12, No. 4, Dec. 1980, pp. 381-402.
Vossler et al., "The Use of Context for Correcting Garbled English Text", Assoc. for Comp. Mach. Proc. of the 19th National Conf., 1964, p. D24-1-13.
Riseman et al., "Contextual Word Recognition Using Binary Diagrams", IEEE Trans. on Computers, vol. 20, No. 4, Apr. 1971, pp. 397-403.
Dolgopolov, "Automatic Spelling Correction", Kibernetika, No. 3, May-Jun. 1986, pp. 61-66.
Kashyap et al., "Spelling Correction Using Probabilistic Methods", Pattern Recognition Letters 2 (1984) pp. 147-154.
Mah et al., "Complete Statistical Indexing of Text By Overlapping Word Fragments", Sigir Forum vol. 17, No. 3, Winter-Spring 1983, pp. 6-16.
Peterson, "Computer Programs for Detecting and Correcting Spelling Errors", Communications of the Alm, vol. 23, No. 12, Dec. 1980 pp. 676-687.
Riseman et al., "A Contextual Postprocessing System for Error Correction Using Binary n-Grams", IEEE Trans. on Computers, vol. L-23, No. 5, May 1974, pp. 480-493.

Primary Examiner—Allen R. MacDonald

[57] ABSTRACT

A word processor with a spelling correction function. A spelling error can result from for example, improperly inputted characters or misread characters. When the improperly input or misread characters are not found, for example in a main dictionary or a user's dictionary of the word processor, characters from a probability table are selected to replace the improper characters which have been caused by the spelling errors. The probability tables can be formed by determining from proper inputting into the word processor the highest frequency of appearance order of two characters. In addition, the probability table can be made by determining the frequency of corrections of an improperly inputted character. When the proper character is added to the improper character which caused the spelling error, the proper character is compared with the main or user dictionary and when it is determined that the character is in the main or user dictionary the character sting is outputted as the correct word from an output portion of the word processor.

6 Claims, 4 Drawing Sheets

Fig. 3

| | a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|---|
| z | | | | | | | | | | | | | | | | | | | | | | | | | | |
| y | | | | | | | | | | | | | | | | | | | | | | | | | 1 | |
| x | | | | | | | | | | | | | | | | | | | | | | | | | | |
| w | | | | | | | | | | | | | | | | | | | | | | | 0 | | | |
| v | | | | | | | | | | | | | | | | | | | | | | | | | | |
| u | | | | | | | | | | | | | | | | | | | | | 7 | | | | | |
| t | | | | | | | | | | | | | | | | | | | | 6 | | | | | | |
| s | | | | | | | | | | | | | | | | | | | 3 | | | | | | | |
| r | | | | | | | | | | | | | | | | | | 32 | | | | | | | | |
| q | | | | | | | | | | | | | | | | | | | | | | | | | | |
| p | | | | | | | | | | | | | | | | 10 | | | | | | | | | | |
| o | | | | | | | | | | | | | | | 25 | | | | | | | | | | | |
| n | | | | | | | | | | | | | | | | | | | | | | | | | | |
| m | | | | | | | | | | | | | 1 | | | | | | | | | | | | | |
| l | | | | | | | | | | | | 20 | | | | | | | | | | | | | | |
| k | | | | | | | | | | | | | | | | | | | | | | | | | | |
| j | | | | | | | | | | | | | | | | | | | | | | | | | | |
| i | | | | | | | | | 8 | | | | | | | | | | | | | | | | | |
| h | | | | | | | | 5 | | | | | | | | | | | | | | | | | | |
| g | | | | | | | | | | | | | | | | | | | | | | | | | | |
| f | | | | | | 0 | | | | | | | | | | | | | | | | | | | | |
| e | | | | | 35 | | | | | | | | | | | | | | | | | | | | | |
| d | | | | | | | | | | | | | | | | | | | | | | | | | | |
| c | | | | | | | | | | | | | | | | | | | | | | | | | | |
| b | | | | | | | | | | | | | | | | | | | | | | | | | | |
| a | 27 | | | | | | | | | | | | | | | | | | | | | | | | | |

Fig. 4

| | OPERATOR'S INTENDED KEY |
|---|---|
| A | |
| B | |
| C | |
| D | |
| E | |
| F | |
| G | |
| H | Y(6) E(4) O(2) S(2) C(1) W(1) |
| I | |
| J | |
| K | |
| L | |
| M | |
| N | |
| O | |
| P | |
| Q | |
| R | |
| S | |
| T | |
| U | |
| V | |
| W | |
| X | |
| Y | |
| Z | |

EUROPEAN LANGUAGE PROCESSING MACHINE WITH A SPELLING CORRECTION FUNCTION

This application is a continuation of application Ser. No. 07/313,493 filed on Feb. 22, 1989, now abandoned.

BACKGROUND OF THE INVENTION

1. Field of the Invention

The present invention generally relates to a documentation machine, and more particularly, to a European language for example English processing machine equipped with a spelling correction function which is capable of selecting usually at least one correct word candidate through one character replacement or one character addition.

2. Description of the Prior Art

Conventionally, in documentation machines such as computer systems, word processors, typewriters or the like dealing with information by words in European languages, for example, in English, there is normally provided a dictionary in order to check whether or not inputted English words or the like are free from errors in spelling. Moreover, at present, there has been further added another function to provide candidates for correct words at the side of the system, besides the function for merely indicating incorrectly spelled words. To this end, a practice most frequently employed at the current stage is a combination of the following four processings.

(1) 1 character replacement:
Ex. stataon→station (Replacement of "a" by "i")
(2) 1 character deletion:
Ex. statioon→station (Deletion of 1 character "o")
(3) 1 character addition:
Ex. staton→station (Addition of "i" between "t" and "o")
(4) Neighboring character inversion:
Ex. statre→stater (Inversion of "re" to "er")

In the aforementioned conventional European language processing machines, one character addition or one character replacement is done in a manner such that each cf alphabet letters "a" through "z" is added or used for replacement merely in order in providing a correct word candidate with respect to an inputted and incorrectly spelt word. Accordingly, it is necessary to repeatedly check whether or not a given word is correct or to repeatedly add the next alphabet or use it for replacement, until the correct word is given. This is disadvantageous in that the selection of the correct word requires a lot of time.

SUMMARY OF THE INVENTION

Accordingly, the present invention has been developed with a view to substantially eliminating the above described disadvantage inherent in the prior art European language processing machine that are equipped with a spelling correction function. The invention has for an important object to provide an improved European language processing machine which is capable of selecting a correct word within a relatively short length of time by reference to a probability table indicative of the frequency of appearance of a correct character.

In accomplishing this and other objects, according to one preferred embodiment of the present invention, there is provided a European language processing machine with a spelling correction function, which includes input means for inputting character information, memory means for storing therein the character information inputted by the input means, dictionary means having a main dictionary and a probability table indicative of a relationship between arbitrary two characters and the frequency of appearance thereof as neighboring characters, character string discrimination means for judging whether or not a character string stored in the memory means is contained in the main dictionary output means for outputting the character string, and character addition and discrimination means for selecting a correct word by adding one character into the character string.

In this European language processing machine, when the character string discrimination means judges that the character string stored in the memory means is not contained in the main dictionary, one character which is the highest one in the frequency of appearance based on the probability table is added to an appropriate portion of the character string. If the character string obtained after one character addition is contained in the main dictionary, the character string is outputted from the output means. If not, another character which is the next highest one in the frequency of appearance is added to the appropriate portion of the character string. In this way, the correct word can be obtained through one character addition into the character string.

In another aspect of the present invention, there is also provided a European language processing machine with a spelling correction function, which includes input means for inputting character information, memory means for storing therein the character information inputted by the input means, dictionary means having a main dictionary and a probability table indicative of a relationship between a character to be mis-read and the frequency of appearance of a character candidate for obtaining a correct word, character string discrimination means for judging whether or not a character string stored in the memory means is contained in the main dictionary, output means for outputting the character string, and character replacement and discrimination means for selecting a correct word by replacing the character to be mis-read by the character candidate.

In such a construction of the European language processing machine, when the character string discrimination means judges that the character string stored in the memory means is not contained in the main dictionary, a character which has been mis-read is replaced by a character which is the highest one in the frequency of appearance based on the probability table. If the character string obtained after one character replacement is contained in the main dictionary, the character string is outputted from the output means. If not, the character which has been mis-read is replaced by another character which is the next highest one in the frequency of appearance. In this way, the correct word can be obtained through one character replacement in the character string As described above, according to the present invention, the correct word can be obtained within a relatively short length of time through one character addition or one character replacement using characters in the order in which they are considered high in the frequency of correctness.

BRIEF DESCRIPTION OF THE DRAWING

This and other objects and features of the present invention will become more apparent from the following description taken in conjunction with the preferred embodiment thereof with reference to the accompanying drawings, throughout which like parts are designated by like reference numerals, and wherein;

FIG. 3 is a probability table which shows the frequency of appearance of arbitrary two characters as neighboring characters and is used during the processing for 1 character addition; and FIG. 4 is another probability table which shows the frequency of appearance of a character candidate in place of an incorrectly inputted character and is used during the processing for 1 character replacement.

DETAILED DESCRIPTION OF THE PREFERRED EMBODIMENTS

Figure 1:
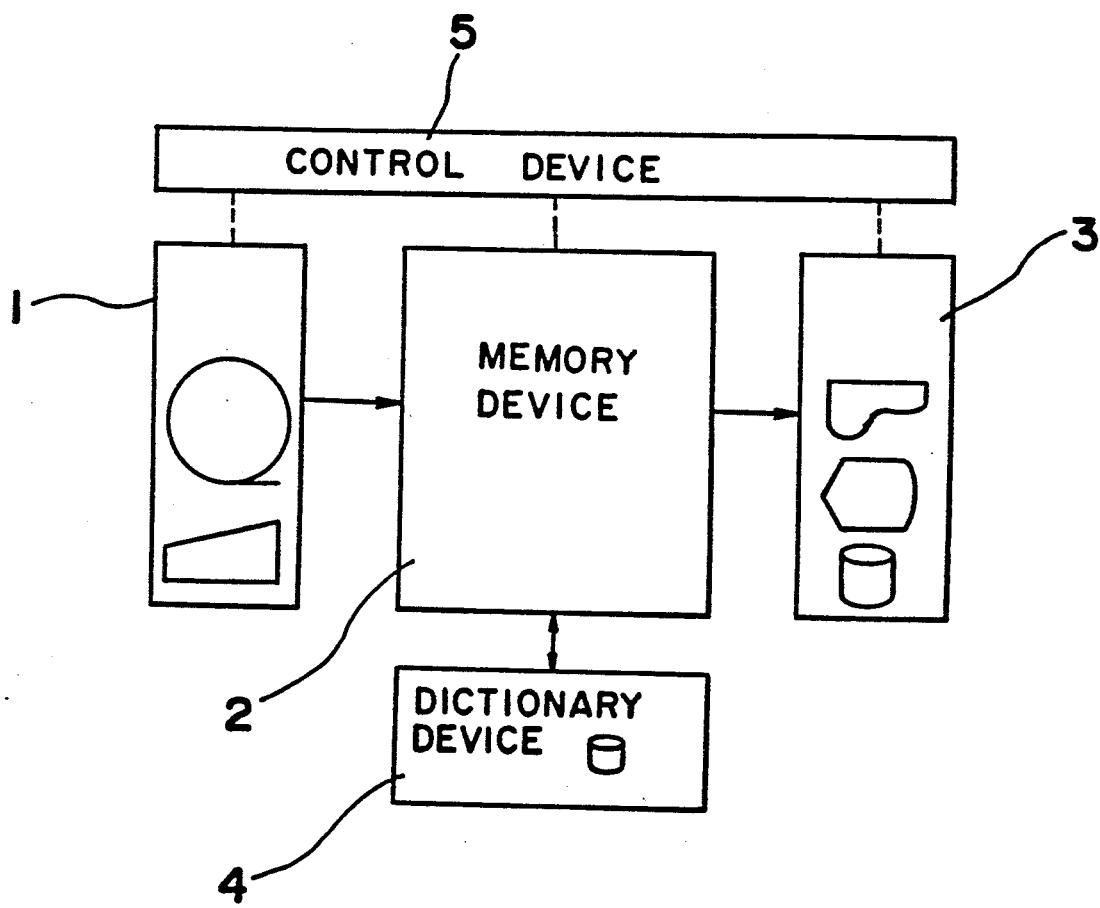
FIG. 1 is a block diagram showing a general construction of a European language processing machine with a spelling correction function according to one preferred embodiment of the present invention.

Referring now to the drawings, there is shown in FIG. 1 a block diagram showing a fundamental construction of a documentation machine or European language processing machine with a spelling correction function according to one preferred embodiment of the present invention.

This machine is generally equipped with an input device 1 in the form of a keyboard, tablet device, optical input device such as an optical character reader (OCR), magnetic tape, verbal input device or the like for inputting word information data in a European language, such as English. A memory device 2 such as a core memory, IC memory, magnetic disc or the like, connected with the input device 1 for storing character information inputted from the input device 1, an output device 3 in the form, for example, of a printer, display unit, magnetic tape, magnetic disc or the like, coupled with the memory device 2 for outputting character word data after editing, stored in the memory device 2, a dictionary device 4 connected to the memory device 2 and having a main dictionary region, a user dictionary region and a segmentation table for supplying useful information with respect to inquiry of spelling information for characters and word data stored in the memory device 2, and a control device 5 constituted, for example, by a computer and coupled with the input device 1, memory device 2, output device 3 and dictionary device 4 for controlling transmission and reception of signals therebetween, and also for effecting correction processing of character strings for the input words to be described later. The control device 5 is provided with a character discrimination means, a character addition and discrimination means and a character replacement and discrimination means.

The segmentation table referred to above memorizes characters or character strings of correct candidates to correspond to input data of character strings or characters to be mis-read due to 1 character cut or 2 character contacting, respectively. The 1 character cut is a phenomenon in which one character is incorrectly read as two characters whereas the 2 character contacting is a phenomenon in which two characters are incorrectly read as one character.

Figure 2:
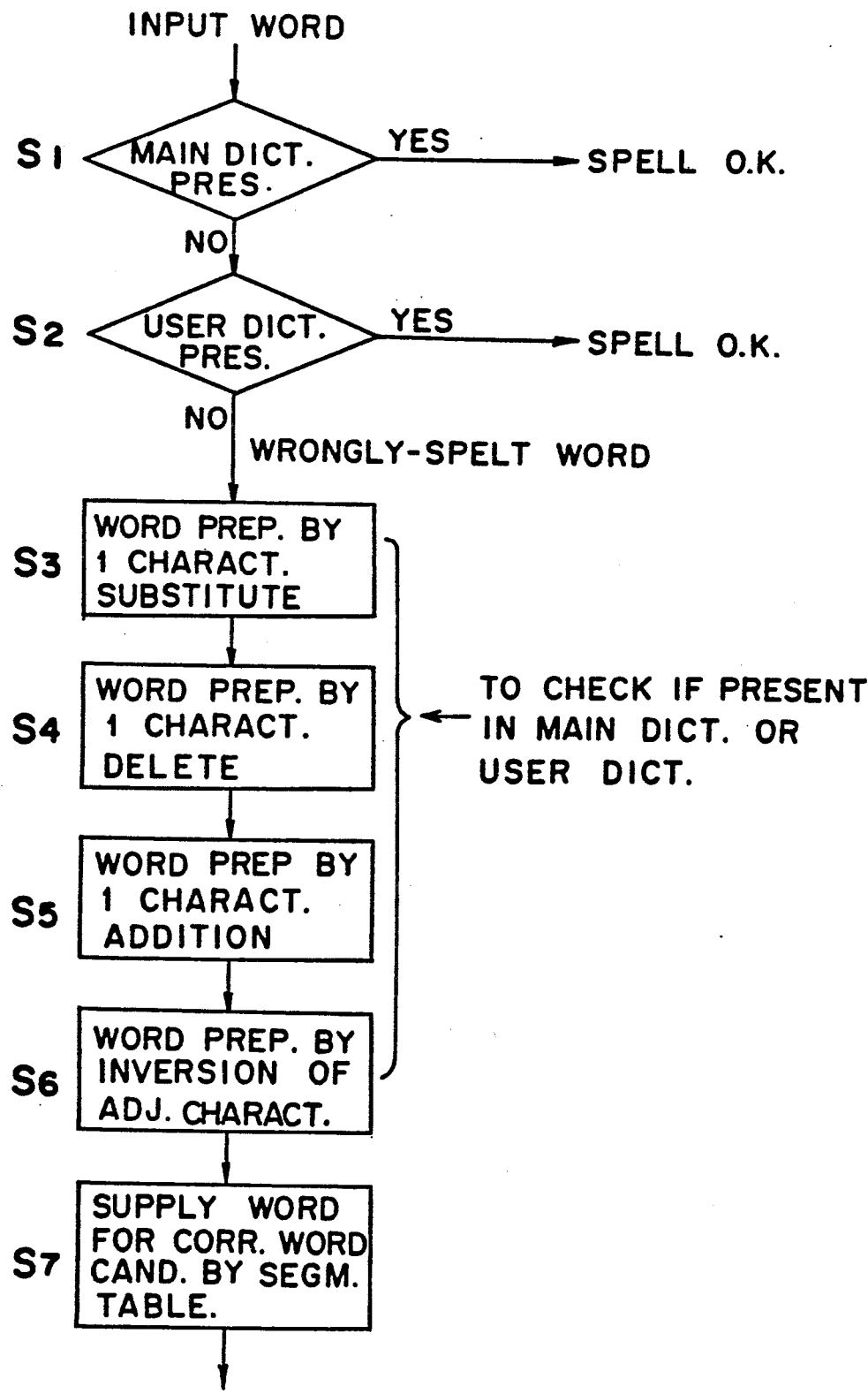
FIG. 2 is a flow-chart for explaining correction processing in the machine of FIG. 1.

Referring also to FIG. 2, there is shown a flow-chart for explaining the correction processing of the European language processing machine with the spelling correction function according to the present invention as described so far.

It is judged at step s1 whether or not a character string of an input word stored in the memory device 2 is contained in the main dictionary. When this character string is contained in the main dictionary, the character string is regarded as correct in spelling and stored in the memory device 2 so as to be further outputted from the output device 3. Otherwise, the procedure proceeds to step s2.

It is judged at step s2 whether or not the character string is contained in the user dictionary. When the character string is contained in the user dictionary, the character string is regarded as correct in spelling and stored in the memory device 2 so as to be further outputted from the output device 3. Otherwise, the procedure proceeds to step s3.

In the above case, the dictionary structure may be of any of known methods such as the method employing Hash practice, method using the branch system, and the dictionary constructing method of the old Word Star of Micro/Pro Co. (i.e., the method based on the two-dimensional index in which capital letter data are horizontally arranged in the order of "A" to "Z", with the character numbers constituting words being vertically arranged), etc.

If the character string is not registered in such main dictionary or user dictionary, the four processings as described earlier are carried out at steps s3, s4, s5 and s6.

More specifically, when it is judged at steps s1 and s2 that a certain word (length: l, constituent characters $C=C_1 \ldots C_i \ldots C_l$) is not present in both the main and user dictionaries, a correct word candidate (correctly spelled word) can be newly derived by the following processings.

(1) 1 character replacement:
A character $C_i$ located at a position (i) ($1 \leq i \leq l$) is replaced by another character $C^*$ other than the character $C^i$.

(2) 1 character deletion:
A character $C_i$ located at a position (i) (b $1 \leq i \leq l$) is deleted.

(3) 1 character addition:
An imaginary character $C^*$ is inserted between neighboring two characters $C_i$ and $C_{i+1}$ located at positions (i) and (i+1) ($0 \leq i \leq l$), respectively.

(4) Neighboring characters inversion:
Neighboring two characters located at positions (i) and (i+1) ($1 \leq i \leq l-1$) are inverted.

Thereafter, it is judged whether or not each character string obtained in this way is present in the main dictionary or user dictionary. If the character string is present in the main dictionary or user dictionary, it is stored in the memory device 2. If not, the procedure proceeds to step s7, at which the character string can be obtained more accurately by reference to the segmentation table stored in the dictionary device 4.

More specifically, in the segmentation table, characters and character strings of correct candidates are so stored as to correspond to the character strings and characters to be mis-read due to the 1 character cut and the 2 character contacting, respectively. Each word which has been mis-read is divided into individual characters or character strings. When these characters or character strings include the same ones as the characters or character strings to be mis-read which have already been registered in the segmentation table, the mis-read characters or character strings are replaced by the character strings or characters of correct candidates corresponding thereto so that a correct word candidate may be selected.

Thereafter, it is judged whether or not this correct word candidate is present in the main dictionary or user dictionary. If the correct word candidate is present in the main dictionary or user dictionary, it is outputted as a correct word into the memory device 2 and output device 3. In this way, the correct word can be obtained more accurately.

FIG. 3 depicts a probability table according to a first embodiment of the present invention, which indicates the frequency of appearance of a character appearing immediately after a specified character. This table is used during the processing of 1 character addition to be carried out at step s5.

The probability table is stored in the dictionary device 4 and has a leftmost row in which all alphabet letters (a) through (z) are vertically lined up in order. This table also has a topmost line in which all alphabet letters (a) through (z) are horizontally lined up in order. In an intersection between a line of a character, for example, (p) in the leftmost row and a row of a character, for example, (a) in the topmost line, a figure (27) is entered which indicates the frequency of the character (a) in the topmost line appearing immediately after the character (p) in the left-most row.

It is to be noted here that the frequencies of appearance of the other characters (a) to (o) and (q) to (z) in the leftmost row is omitted.

If a word "apple" has erroneously been read in and a character string "appe" has been inputted, the character addition and discrimination means in the control device 5 deals with this kind of error as follows in selecting a suitable character to be inserted after a character string "app". According to the table of FIG. 3, the frequencies of characters (a), (e), (h), (i), (1), (m), (o), (p), (r), (s), (t), (u) and (y) appearing after the character (p) are 27, 35, 5, 8, 20, 1, 25, 10, 32, 3, 6, 7 and 1, respectively. In these characters, the character (e) is the highest one in the frequency of appearance. Accordingly, this character (e) is inserted between "app" and "e" of the incorrectly inputted character string "appe". As a result, a character string "appee" is given which may coincide with the operator's intended word. Thereafter, it is judged whether or not the character string "appee" is contained in the main or user dictionary. If the former is not contained in the latter, the character "r", which is the next highest one in the frequency of appearance, is inserted in place of the character "e". Such a process is repeatedly executed until the correct word is obtained. In the case of the character string "appe", the correct word "apple" can be obtained upon five times repetition of character insertion.

In this way, each character is successively inserted from the highest one in order of the frequency of appearance, thus enabling the correct word to be found out within a shorter length of time as compared with a case in which each alphabet is successively inserted from the first character "a" in turn.

In the foregoing embodiment, a character following the character located immediately before a position for character insertion in an incorrectly inputted character string is selected from the probability table.

However, a character may be selected which is followed by the character located immediately after the position for character insertion.

FIG. 4 depicts another probability table according to a second embodiment of the present invention, which indicates the frequency of appearance of an operator's intended character to be inputted in place of an incorrectly inputted character. This table is tabulated on the basis of operator's keystroke errors through a keyboard and is used in the process of one character replacement to be carried out at step s3.

This table is stored in the dictionary device 4 and has a leftmost row in which all alphabet letters (A) through (Z) are vertically lined up in order. In this table, each alphabet in the leftmost row has on its right side a plurality of alphabet letters lined in order of probability, which may contain an operator's intended alphabet to be primarily inputted through the keyboard. A figure in parentheses of each alphabet indicates the probability thereof. In the table of FIG. 4, the operator's intended keys corresponding to incorrectly inputted keys "A" to "G" and "I" to "Z" are omitted.

For example, when a character "H" is incorrectly inputted through the keyboard and is replaced by an operator's intended one, the character replacement and discrimination means in the control device 5 deals with this kind of error as follows.

More specifically, among from the characters listed in the line of the character "H", a character "Y" which is the highest one in probability is used in place of the character "H". thereafter, it is judged whether or not a new character string produced by the replacement is contained in the main or user dictionary. If the former is not contained in the latter, a character "E" which is the next highest one in probability is used for the replacement. Such a process is repeatedly executed until the correct word is obtained.

In this way, the character replacement is done using probable characters in order of probability, thus enabling the correct word to be obtained within a relatively short length of time as compared with a case in which the replacement is merely done from the first alphabet "a" in turn.

It is to be noted that in this embodiment, although the probability table is tabulated on the basis of the operator's keystroke errors through the keyboard, the table may be tabulated on the basis of read errors by the OCR, recognition errors in the event of verbal input or the like.

As is clear from the above, according to the present invention, the correct word can be obtained within a relatively short length of time through one character addition or one character replacement, preferentially using characters which are considered high in the frequency of correctness.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A word processing apparatus equipped with a spelling correction portion, comprising:

input means for inputting character information;

memory means, operatively connected to said input means for storing the character information inputted by said input means;

a control apparatus operatively connected to said memory means; and dictionary means, operatively connected to said memory means, for storing a main dictionary and a probability table indicative of a relationship between two arbitrary characters and a frequency of appearance thereof as neighboring characters;

said control apparatus including, character string discrimination means for judging whether a character string stored in said memory means is contained in said main dictionary, output means for outputting the character string, when the character string discrimination means judges that character string is contained in the main dictionary, and character addition and discrimination means responsive to the character string discrimination means for selecting a correct word for outputting by adding one character at a time into a character string containing an error, the added character being selected based on a highest frequency of appearance order established in said probability table until a character string with the added character is identified as being contained in said main dictionary, and upon being identified as being contained in said main dictionary, said character string with the added character is then outputted by said output means, wherein said probability table includes the letters of the alphabet A to Z, listed in sequence from A to Z in a vertical row and in a horizontal row there are letters of the alphabet, so that the frequency of appearance is an intersection of specific letters from each row.

2. The apparatus as claimed in claim 1, wherein said dictionary means includes a user's dictionary so that when a character is added to the character string to form a new character string, and the new character string is not in the main dictionary, said control apparatus can judge and output the new character string by additionally using the user's dictionary.

3. A word processing apparatus equipped with an input correction portion comprising:

input means for inputting character information;

memory means, operatively connected to said input means, for storing the character information inputted by said input means;

dictionary means, operatively connected to said memory means, for storing a main dictionary and a probability table indicative of a relationship between a character misread and a frequency of appearance of a character that can be used for obtaining a correct word from a word in which the character is misread; and a control apparatus operatively connected to said memory means and said dictionary means;

said control apparatus including, character string discrimination means for judging whether a character string stored in said memory means is contained in said main dictionary, output means for outputting the character string, when the character string discrimination means judges that character string contained in the main dictionary, and character replacement and discrimination means responsive to the character string discrimination means for forming a correct string by replacing the character misread with a character that can be used for correcting the misread character;

said character replacement and discrimination means selecting a character from said probability table based on a highest frequency order established in said probability table until a character string with the replaced character provides a character string found in said main dictionary, and upon being identified as being contained in said main dictionary, said character string the replaced character is then outputted from said output means, wherein said probability table includes the letters of the alphabet A to Z, listed in sequence from A to Z in a vertical row and in a horizontal row there are letters of the alphabet, so that the frequency of appearance is an intersection of specific letters from each row.

4. The apparatus as claimed in claim 3, wherein said dictionary means includes a user's dictionary so that when a new character is added to the character string to form a new character string, and the new character string is not in the main dictionary, said control apparatus can judge and output the new character string by additionally using the user's dictionary.

5. A word processing apparatus equipped with a spelling correction portion, comprising:

input means for inputting character information;

memory means, operatively connected to said input means for storing the character information inputted by said input means; a control apparatus operatively connected to said memory means; and dictionary means, operatively connected to said memory means, for storing a main dictionary and a probability table indicative of a relationship between two arbitrary characters and a frequency of appearance thereof as neighboring characters;

said control apparatus including, character string discrimination means for judging whether a character string stored in said memory means is contained in said main dictionary, output means for outputting the character string, when the character string discrimination means judges that character string is contained in the main dictionary, and character addition and discrimination means responsive to the character string discrimination means for selecting a correct word for outputting by adding one character at a time into a character string containing an error, the added character being selected based on a highest frequency of appearance order established in said probability table until a character string with the added character is identified as being contained in said main dictionary, and upon being identified as being contained in said main dictionary, said character string with added character is then outputted by said output means, wherein said probability table includes the letters of the alphabet, A to Z, listed in sequence in a vertical row and a horizontal row so that the frequency of appearance is the intersection of specific letters from each row.

6. A word processing apparatus equipped with an input correction portion comprising:

input means for inputting character information;

memory means, operatively connected to said input means, for storing the character information inputted by said input means;

dictionary means, operatively connected to said memory means, for storing a main dictionary and a probability table indicative of a relationship between a character misread and a frequency of appearance of a character that can be used for obtaining a correct word from a word in which the character is misread;

a control apparatus operatively connected to said memory means and said dictionary means;

said control apparatus including, character string discrimination means for judging whether a character string stored in said memory means is contained in said main dictionary, output means for outputting the character string, when the character string discrimination means judges that character string contained in the main dictionary, and character replacement and discrimination means responsive to the character string discrimination means for forming a correct string by replacing the character misread with a character that can be used for correcting the misread character;

said character replacement and discrimination means selecting a character from said probability table based on a highest frequency order established in said probability table until a character string with the replaced character provides a character string found in said main dictionary, and upon being identified as being contained in said main dictionary, said character string the replaced character is then outputted from said output means wherein said probability table includes the letters of the alphabet A to Z listed in sequence in a vertical row and a horizontal row so that the frequency of appearance is the intersection of specific letters from each row.

* * * * *